（12） United States Patent
Chalopin et al.

(10) Patent No.: US 7,386,645 B2
(45) Date of Patent: Jun. 10, 2008

(54) SYSTEM ON A CHIP WITH AN ARBITRATION UNIT TO GRANT RIGHT OF ACCESS TO A COMMON RESOURCE IN RESPONSE TO CONFLICTING REQUESTS FOR ACCESS FROM INITIATOR MODULES, AND STORAGE KEY INCORPORATING THE ARBITRATION UNIT

(75) Inventors: Herve Chalopin, Aubagne (FR); Laurent Tabaries, Aubagne (FR)

(73) Assignee: STMicroelectronics SA, Montrouge (FR)

( * ) Notice: Subject to any disclaimer, the term of this patent is extended or adjusted under 35 U.S.C. 154(b) by 180 days.

(21) Appl. No.: 11/120,167

(22) Filed: May 2, 2005

(65) Prior Publication Data

US 2005/0256992 A1    Nov. 17, 2005

(30) Foreign Application Priority Data

May 3, 2004    (FR)    ................... 04 04703

(51) Int. Cl.
*G06F 13/36* (2006.01)
*G06F 13/364* (2006.01)
*G06F 12/00* (2006.01)
*G06F 13/18* (2006.01)
*G06F 13/38* (2006.01)

(52) U.S. Cl. ................... 710/241; 710/41; 710/243; 710/244; 370/462; 700/11

(58) Field of Classification Search ................. 710/241, 710/309, 113, 120, 123, 243, 244, 41, 117, 710/116, 107; 370/431, 359, 462, 386; 700/11
See application file for complete search history.

(56) References Cited

U.S. PATENT DOCUMENTS

| 4,374,414 | A | * | 2/1983 | Comfort et al. | 710/243 |
|---|---|---|---|---|---|
| 4,394,728 | A | * | 7/1983 | Comfort et al. | 710/243 |
| 4,395,753 | A | * | 7/1983 | Comfort et al. | 710/120 |
| 5,265,223 | A | * | 11/1993 | Brockmann et al. | 710/123 |
| 5,509,134 | A |   | 4/1996 | Fandrich et al. | 395/430 |
| 5,528,767 | A |   | 6/1996 | Chen | 395/293 |

(Continued)

OTHER PUBLICATIONS

"A fluid flow tracking arbiter for input buffered ATM switch with heterogeneous port bandwiidth" by M. Vishnu (abstract only) Publication date: Dec. 1-5, 2003.*

*Primary Examiner*—Gopal C. Ray
(74) *Attorney, Agent, or Firm*—Lisa K. Jorgenson; Dennis M. de Guzman; Seed IP Law Group PLLC

(57) ABSTRACT

An electronic system comprises a defined number N of functional modules, including a defined number P of initiator modules and a defined number Q of target modules, where N, P and Q are integer numbers such that $2 \leqq P \leqq N$ and $1 \leqq Q \leqq N$. In the event of a plurality of conflicting requests to access a common resource originating from a plurality of respective initiator modules, an arbitration unit grants an exclusive right of access to the resource to a defined one of these initiator modules. The arbitration unit is constructed either to apply a standard arbitration mechanism to these respective initiators, or to apply as a priority a specific arbitration mechanism only to the members of a subset of these initiator modules, for each of which it receives a linked privileged access signal.

27 Claims, 2 Drawing Sheets

U.S. PATENT DOCUMENTS

| | | | |
|---|---|---|---|
| 5,884,051 A | | 3/1999 | Schaffer et al. ............. 395/287 |
| 5,949,789 A | * | 9/1999 | Davis et al. ................. 370/452 |
| 6,157,978 A | | 12/2000 | Ng et al. ..................... 710/240 |
| 2003/0229743 A1 | * | 12/2003 | Brown ........................ 710/113 |
| 2005/0256992 A1 | * | 11/2005 | Chalopin et al. ............ 710/309 |

* cited by examiner

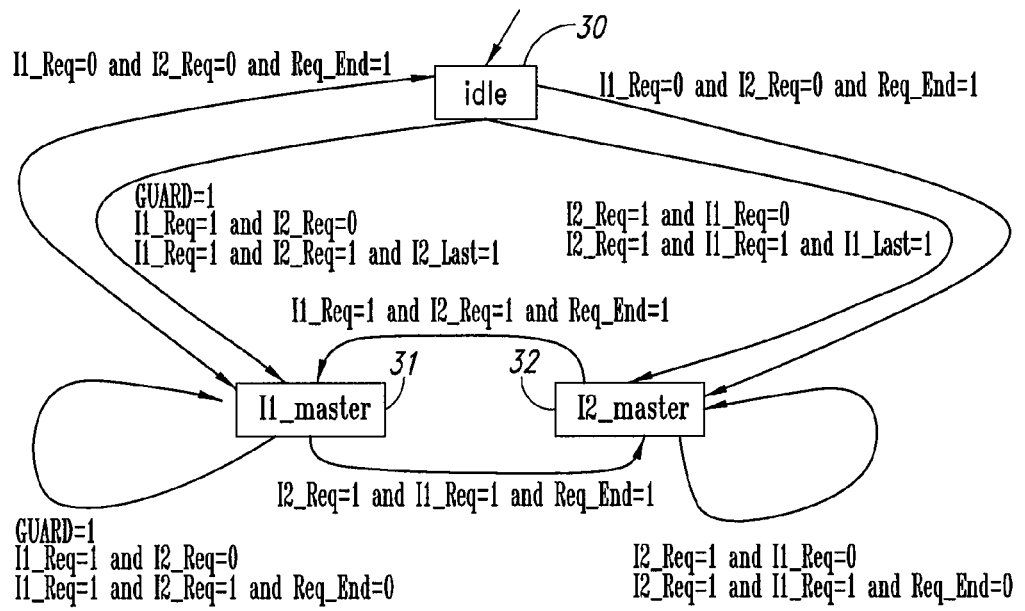
FIG. 3
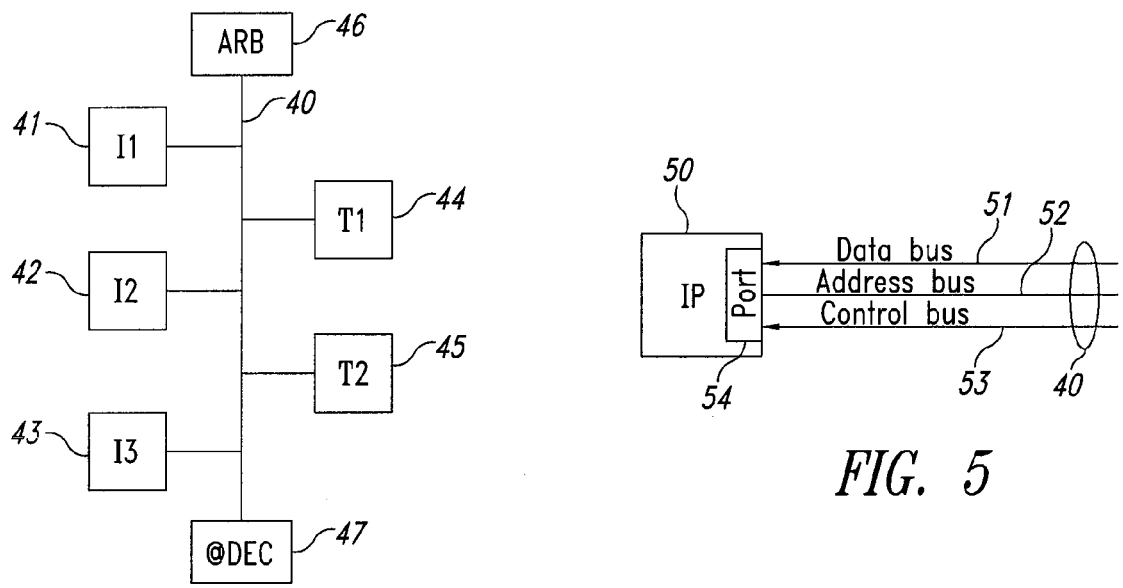
FIG. 4
FIG. 5

SYSTEM ON A CHIP WITH AN ARBITRATION UNIT TO GRANT RIGHT OF ACCESS TO A COMMON RESOURCE IN RESPONSE TO CONFLICTING REQUESTS FOR ACCESS FROM INITIATOR MODULES, AND STORAGE KEY INCORPORATING THE ARBITRATION UNIT

BACKGROUND OF THE INVENTION

1. Field of the Invention

The present invention relates generally to the field of integrated circuit digital electronic systems, called "systems on a chip" or SoC.

More specifically, the invention relates to the arbitration mechanisms for managing conflicting access requests initiated by different functional modules in such a system.

2. Description of the Related Art

In a digital electronic system, resources are conventionally shared between functional modules that have access to them. Such a functional module is sometimes called a virtual component or an "intellectual property" block, or even IP block in professional jargon. It is designed to handle a defined function, or is for general-purpose use (it may be a microprocessor or a microcontroller). It can be implemented in the form of hardware and/or software elements.

A distinction is drawn between master type modules (hereinafter called initiator modules), which take the initiative to exchange data with one or more other modules, and slave type modules (hereinafter called target modules), the role of which is to respond to the requests received from the initiator module which has control. If there is a plurality of initiator modules, an arbitration unit (or arbiter) is required to arbitrate between conflicting requests to access a common resource originating from different initiator modules, to grant an exclusive right of access to the resource to a specific one of said initiator modules.

In the current state of the art, there are various arbitration mechanisms that can be implemented in an arbitration unit. For example, a Round Robin algorithm enables the right of access to be granted sequentially to the requesting initiator modules, each in turn. As a variant, a Least Recently Used (LRU) algorithm grants the right of access to the initiator module that requests it and which had access least recently. Other algorithms are based on fixed priority rights, respectively linked to the initiator modules.

In some architectures it is desirable to provide for exceptions to the application of a standard arbitration mechanism in the event of conflicting requests, in order to reserve a privileged right of access dynamically to a defined one of the initiator modules. It may also be desirable to be able dynamically to reserve a privileged right of access to a defined one of a restricted group of initiator modules in the event of conflicting requests to access a particular resource, according to a specific arbitration mechanism applying as a priority to the initiator modules of this group. The phrase "as a priority" should be understood to mean that the specific arbitration mechanism is applied, instead of the standard arbitration mechanism, only to the initiator modules of said group.

Obviously, consideration may be given to using a configurable priority algorithm. Such an algorithm, implemented in software, is, however, very complex and therefore too slow to execute for certain applications.

BRIEF SUMMARY OF THE INVENTION

This is why a first aspect of the invention proposes an electronic system comprising a defined number N of functional modules, including a defined number P of initiator modules and a defined number Q of target modules, where N, P and Q are integer numbers such that $2 \leq P \leq N$ and $1 \leq Q \leq N$, and in addition comprising an arbitration unit for, in the event of a plurality of conflicting requests to access a common resource originating from a plurality of respective initiator modules, granting an exclusive right of access to the resource to a defined one of said plurality of respective initiator modules. Advantageously, the arbitration unit is constructed to grant the exclusive right of access either via a standard arbitration mechanism applied to said plurality of respective initiator modules, or as a priority via a specific arbitration mechanism applied only to the members of a subset of said plurality of initiator modules, for each of which the arbitration unit receives a privileged access signal linked to said initiator module on the one hand and to said specific arbitration mechanism on the other.

Such a solution can be implemented in the hardware. It then offers the possibility of quicker and more flexible arbitration management.

In some applications, the initiator modules are linked to the target modules via the arbitration unit, the latter also forming a control module for information interchanges between said initiator modules and said target modules. The common resource is then one of said target modules.

In other applications, the functional modules and the arbitration unit are linked together via a communication bus. The aforementioned common resource is then said communication bus, used for information interchanges between said initiator modules and said target modules.

The number of specific arbitration mechanisms is not limited to one. On the contrary, the arbitration unit can be constructed, in addition, to select the specific arbitration mechanism to be applied, as a higher level arbitration mechanism from a hierarchy of specific arbitration mechanisms, which are each applicable only to the members of a respective subset of the plurality of initiator modules for each of which the arbitration unit receives a privileged access signal linked to said initiator module and to said specific arbitration mechanism and in addition privileged access signals linked to said initiator module on the one hand and respectively to each of the lower level specific arbitration mechanisms on the other.

In one embodiment, a privileged access signal linked to a defined initiator module is generated by reading the value stored in a data register linked to said initiator module. This allows for dynamic arbitration management by simply writing into a register.

For example, the data register linked to a defined initiator module can be accessible in write mode by said initiator module itself. Advantageously, it can be a register included in the arbitration unit.

As a variant, or as a complement, a privileged access signal linked to said initiator module, or to another defined initiator module, is a signal received from the external environment.

In one embodiment, the arbitration unit is implemented in the form of a state machine.

A second aspect of the invention proposes a storage key comprising at least one non-volatile memory and a control circuit, characterized in that the control circuit is a circuit on a chip forming a system according to the first aspect above.

BRIEF DESCRIPTION OF THE SEVERAL VIEWS OF THE DRAWING(S)

Other features and advantages of the invention will emerge on reading the description that follows. This is purely illustrative and should be read alongside the appended drawings in which:

FIG. 3 is a state diagram illustrating the operation of an arbitration unit which can be included in the system in FIG. 2;

FIG. 4 is a block diagram of another example of electronic system according to the first aspect of the invention; and, FIG. 5 is a diagram illustrating the coupling of a functional module to a communication bus in a system according to FIG. 4.

DETAILED DESCRIPTION OF THE INVENTION

The invention is described below in an example of application to a control circuit intended to manage a storage key or memory key.

A memory key forms a mass storage medium of small dimensions, mounted in a removable support taking the form of a key or key holder. This medium is used to store and transport easily a certain quantity of data, in order, for example, to transfer it from one computer to another. Such a memory key is in principle inserted into the USB (Universal Serial Bus) ports of the computers. This is why it is also referred to as USB storage key, USB memory key or quite simply USB key.

Figure 1:
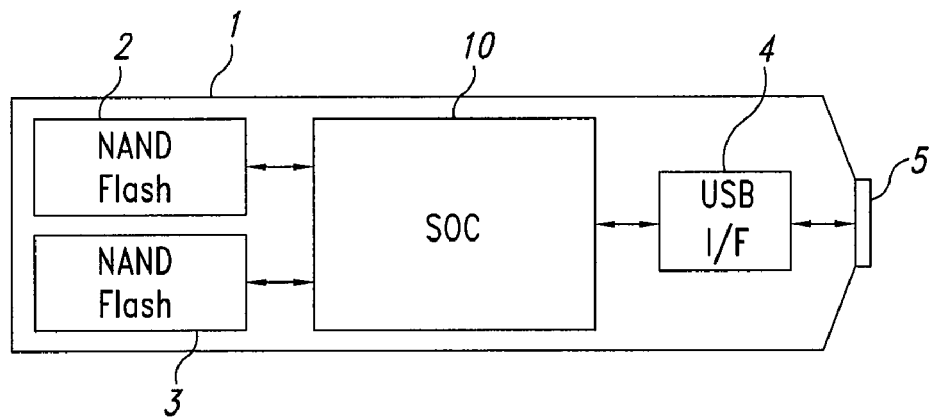
FIG. 1 is a block diagram of an example of memory key according to the second aspect of the invention.

In FIG. 1, such a memory key 1 comprises a control circuit 10, coupled to a USB type connector 5, via a USB interface circuit 4. Moreover, the circuit 10 is coupled to one or more non-volatile, large capacity memories 2, 3, which are typically NAND-Flash or similar type memories. The circuit 10 is remotely powered when the memory key 1 is connected via the connector 5 to a computer (not shown) or similar. The interface circuit 4 can, for example, provide compatibility with the USB 2.0 standard (standard for data interchange between general purpose computers and their peripheral devices).

The control circuit can advantageously be a system on a chip (SoC) to provide a high degree of integration that allows the miniaturization desired for this kind of electronic product.

Figure 2:
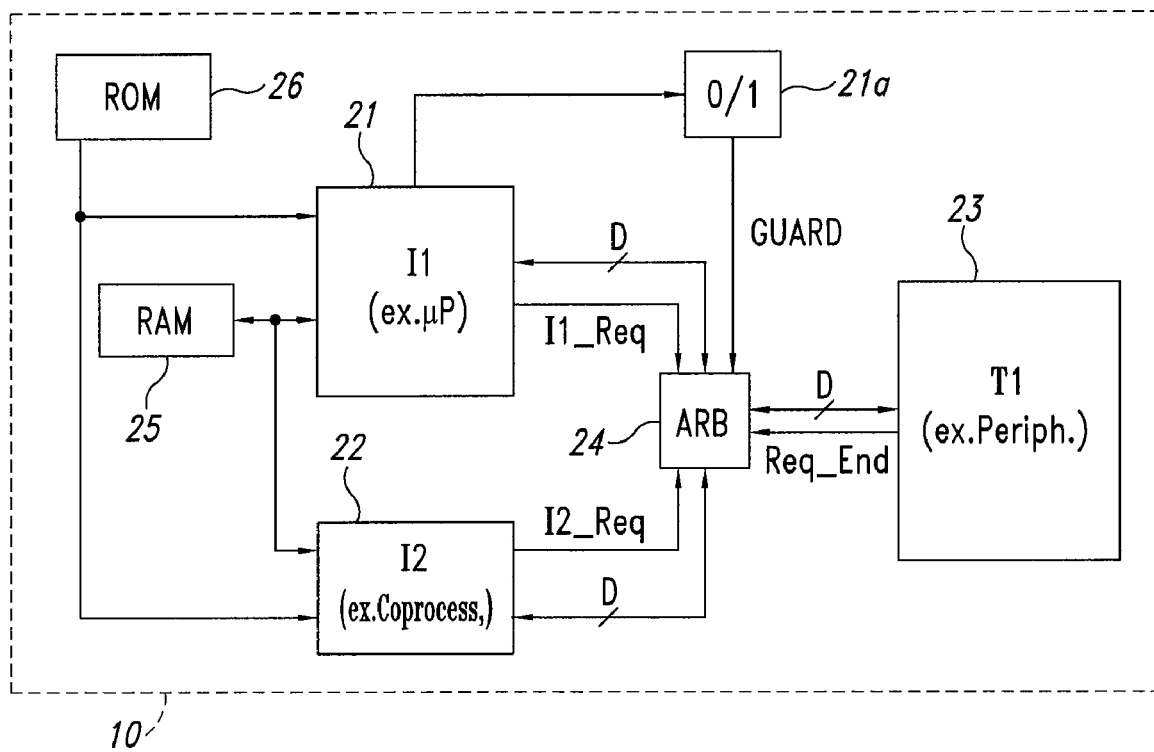
FIG. 2 is a block diagram of an example of an electronic system according to the first aspect of the invention, which can be included in the memory key in FIG. 1.

FIG. 2 illustrates a typical architecture of such a system.

In this example, the system 10 comprises two cores 21 and 22, which are, for example, respectively a microcontroller such as the ST7 from STMicroelectronics, and a coprocessor dedicated to control operations for the mass storage means formed by the internal memories 2 and 3.

These cores 21 and 22 are designed as initiating type functional modules (respectively I1 and I2). For communication between themselves and with other functional modules, they comply, for example, with the specifications of the VCI (Virtual Component Interface) standard of the VSIA (Virtual Socket Interface Alliance), Wakefield, Mass., United States. To that end, certain modules may need a VCI interface, as is the case with the ST7 microcontroller, although this interface is not shown in the figure, because, as such, they do not support this standard.

A volatile memory (Random Access Memory, or RAM) 25 is used by the modules 21 and 22 to store temporary information, linked to the application concerned. In addition, a non-volatile memory (Read Only Memory, or ROM) 26 stores permanent data, in particular the code of the application which is loaded into the modules 21 and/or 22 on power up.

The system 10 also comprises a peripheral controller 23, in particular a USB 2.0 function controller, such as the MUSBHSFC Inventra™ virtual component from Mentor Graphics, as a target type functional module (T1). This virtual component is compatible with the aforementioned VCI standard.

Both the microcontroller 21 and the coprocessor 22 can have access, on request, to the peripheral controller 23. Data (D) can be interchanged between the initiator modules 21 and 22 on the one hand and the target module 23 on the other, via the arbitration unit 24 forming a control module for such data interchanges. In other words, the controller 23 is a common resource for both cores 21 and 22.

This is why the system 10 also comprises an arbitration unit 24 (ARB). In the event of conflicting requests to access the target module 23 originating respectively from the initiator modules 21 and 22, the unit 24 grants an exclusive right of access to the resource to just one of them, by applying a defined arbitration mechanism. In FIG. 2, I1_Req and I2_Req are the names given to the access request signals delivered to the arbitration unit 24 respectively by the initiator module 21 and by the initiator module 22. These signals are activated (that is set to their active state, for example the logic 1 state), when the corresponding initiator module needs to access the target module 23. There is conflict when the signals I1_Req and I2_Req are active simultaneously. The arbitration unit 24 must arbitrate on this conflict.

To this end, the arbitration unit is constructed to grant an exclusive right of access to the target module 23, either via a standard arbitration mechanism, applied to the initiator modules 21 and 22, or as a priority to the initiator module 21 when it receives a privileged access signal (correctly set to its active state, for example the logic 1 state) linked to said initiator module 21. The standard arbitration mechanism can be of any known type, for example a Round Robin, Least Recently Used or fixed priority algorithm.

In other words, the privileged access signal GUARD dynamically provides the initiator module 21 with priority access to the target module 23 when active (GUARD=1). The term "priority access" should be understood to mean that the access is granted independently of the standard arbitration mechanism, which is applied only when the GUARD signal is idle (GUARD=0). This solution is based on a hardware rather than software implementation. It therefore provides for faster arbitration mechanism management.

In one embodiment, the privileged access signal GUARD linked to the initiator module 21 is generated by reading a value stored in a data register 21a linked to said initiator module 21. This register 21a can advantageously be included in the arbitration unit 24. Preferentially, the register 21a can be accessed in write mode by the initiator module 21 to which it is linked. This enables the application running in the initiator module to reserve an access privilege according to its requirements.

As a variant, the privileged access signal linked to the initiator module 21 is a signal received from outside the system 10. It may be, for example, a static configuration signal or any external excitation signal.

In an embodiment of the invention, the arbitration unit is implemented in the form of a state machine, an example of operation of which is illustrated by the state diagram in FIG. 3.

In this example, the arbitration unit has three different states. An idle state 30, a first active state 31 (I1_Master) in which the access right is granted to the initiator module 21, and a second active state 32 (I2_Master) in which the access right is granted to the initiator module 22.

In one example, the arbitration unit implements a standard Least Recently Used algorithm based arbitration mechanism. In one embodiment of such an arbitration mechanism, the arbitration unit manages internal signals I1_Last and I2_Last. In the active state (for example in the logic 1 state), these internal signals I1_Last and I2_Last respectively indicate that the initiator module 21 or the initiator module 22 is the one that was granted the right of access to the target module. Also, the arbitration unit 24 receives a control signal Req_End from the target module 23 which is active (for example in the logic 1 state) to indicate that processing by the target module of the current request is complete. In practice, the arbitration unit 24 must not allow access to the target module by another initiator module before processing of the current request is finished. In other words, the exclusive right of access granted to an initiator module must be maintained until processing of the request for which it was granted is finished.

The description goes on to detail all the possible state transition conditions.

Starting from the idle state 30, the transition to the active state 31 (I1_master) occurs when the module 21 generates an access request (I1_Req=1) and the module 22 does not send one (I2_Req=0). Similarly, the transition from state 30 to state 31 occurs when the module 21 and the module 22 both send an access request (I1_Req=1 and I2_Req=1) and the module 22 is the last to have had access to the target module 23 (I2_Last=1). Finally, the transition from state 30 to state 31 also occurs when the privileged access signal linked to the module 21 is activated (GUARD=1).

The transition back from state 31 to state 30 occurs when neither the module 21 nor the module 22 requires access to the module 23 (I1_Req=0 and I2_Req=0) and, in addition, the current request is finished (Req_End=1).

Symmetrically, the transition from the idle state 30 to the active state 32 (I2_master) occurs when the module 22 generates an access request (I2_Req=1) and the module 21 does not send one (I1_Req=0). This corresponds to an absence of conflict. Moreover, the transition from state 30 to state 32 also occurs, in the case of conflicting requests originating from the modules 22 and 21 (I2_Req=1 and I1_Req=1) and in addition, the module 21 is the last to have had access to the target module 23 (I1_Last=1). Note that in the case of the module 22 there is no additional condition for the transition from state 30 to state 32, comparable to the case of an access privilege granted to module 21 when its linked privileged access signal GUARD is in the active state.

The transition back from state 32 to state 30 occurs when neither the module 21 nor the module 22 sends new access requests (I1_Req=0 and I2_Req=0) and in addition processing of the current request by the target module 23 is finished (Req_End=1). From state 31, the arbitration unit 24 switches to state 32 when conflicting access requests are produced by both the module 21 and the module 22 (I1_Req=1 and I2_Req=1) and, in addition, processing of the current request by the target module 23 is finished (Req_End=1). This results from application of the Round Robin type standard arbitration mechanism. Note that, inasmuch as there are only two initiator modules in the example considered here, the same condition applies when the arbitration unit 24 implements a Least Recently Used arbitration mechanism.

Conversely, the transition from state 32 to state 31 occurs when the module 21 and the module 22 send conflicting access requests (I1_Req=1 and I2_Req=1) and, in addition, processing of the current access request by the target module 23 is finished (Req_End=1).

State 31 is maintained when one of the following conditions is satisfied. Firstly, when the module 21 sends an access request (I1_Req=1) and not the module 22 (I2_Req=0). Secondly, when both the module 21 and the module 22 send access requests (I1_Req=1 and I2_Req=1) but processing of the current request by the module 23 is not finished (Req_End=0). And thirdly, when the privileged access signal linked to the module 21 is in the active state (GUARD=1). In this latter case, the access privilege granted to the module 21 should be maintained.

Finally, and symmetrically, state 32 is maintained when the module 22 sends an access request (I2_Req=1) but not the module 21 (I1_Req=0), or even when both the module 21 and the module 22 send conflicting access requests (I2_Req=1 and I1_Req=1) but processing of the current request by the module 23 is not finished (Req_End=0). Note here, too, that there is no third condition as in the case considered above in which step 31 is maintained, given that, in the example considered here, there is no privileged access signal linked to the module 22.

The invention has been described above in a preferred but non-limiting example of application.

In the above example, the number N of functional modules in the system is equal to 3, the number P of initiator modules is equal to 2 and the number Q of target modules is equal to one. However, it is understood that the invention can be applied equally to more complex system architectures, provided that $2 \leq P \leq N$ and $1 \leq Q \leq N$. Note that some functional modules can be both initiating and target type modules.

In addition, the invention can also be applied to digital electronic systems comprising a communication bus which is functionally shared between components that are linked to it. In other words, this bus is a common resource, shared between the initiator modules. It is used by the initiator modules to exchange data with the target modules, for example in a "full crossbar" configuration (in other words, each initiator module can access each target module). Such an architecture is more suitable when the number P of initiator modules and/or the number Q of target modules becomes large. The arbitration unit is then required to grant access to this common resource, that is, allocate control of the bus, to a defined one of the initiating components. If there is a plurality of target components (Q>1), an address decoder is also charged with activating the target component nominated by the initiating component controlling the bus.

A specific arbitration mechanism can thus be applied, as a priority in relation to the standard arbitration mechanism which is applied to a set (a plurality) of initiator modules which produce conflicting access requests, only to the members of a subset of initiator modules, for each of which the arbitration unit receives a privileged access signal linked to said initiator module on the one hand and to said specific arbitration mechanism on the other hand. When said subset comprises only one member (as in the example described above in relation to FIGS. 2 and 3), the arbitration mechanism to be applied is the simplest possible mechanism, since it consists in granting the right of access to said member.

The invention is not limited by the number of specific arbitration mechanisms either. Indeed, embodiments can be envisaged in which there is a plurality of specific arbitration mechanisms. For example, these mechanisms are applied hierarchically, that is, by a system of relative priorities. These various arbitration mechanisms are each applicable only to the members of a respective subset of the set formed of initiating components that produce conflicting access requests. In an embodiment, the initiator modules of this subset are those for each of which the arbitration unit receives a privileged access signal linked to said initiator module and to said specific arbitration mechanism on the one hand, and a privileged access signal linked to said initiator module and to each of the lower level specific arbitration mechanisms respectively on the other hand. The arbitration unit can then be constructed to select the specific arbitration mechanism to be applied, which can be the higher level arbitration mechanism in the hierarchy of arbitration mechanisms. This selection can be based, for example, on a decoding of the privileged access signals, which give to the specific arbitration mechanism to which they are respectively linked a defined level in the aforementioned hierarchy, that is, a defined priority for being selected.

As an illustration, the diagram in FIG. 4 shows the architecture of a system with a communication bus 40. Initiator modules 41, 42 and 43, and target modules 44 and 45, are linked to the bus 40. Each of the above modules is linked to the bus 40 via a communication port of master or slave type depending on whether the module concerned is an initiating or target module, respectively. It should be remembered that some modules can be both initiating and target type modules. In this case, they are linked to the bus 40 via respective ad hoc communication ports.

The system also comprises an address decoder 47 which is linked to the bus 40, and an arbitration unit 46, or arbiter, which is also linked to the bus 40 for selecting that one of the initiator modules 41, 42 or 43 which has control of the bus 40 at a defined moment.

The communication bus 40 comprises channels for data communication between the various components of the system.

As illustrated by the diagram in FIG. 5, the communication bus 40 can thus comprise, in one example, a data bus 51, an address bus 52 and a control bus 53. In some cases, the data bus 51 comprises a sub-data bus for reading data and sub-data bus for writing data. A functional module 50 of the system comprises a communication port 54 which can be of master or slave type depending on whether the module 50 is of initiating or target type, respectively. The port 54 links the module 50 to the communication bus 40.

The data bus 51 is used to transmit the data signals, which contain the information interchanged between the modules of the system.

The address bus 52 is used to transmit the address signals, which indicate the module in which the data transmitted over the data bus must be read or written, and, where appropriate, the location of the data within the module concerned.

Finally, the control bus 53 is used to transmit the control signals. Such signals are used in particular by the initiator modules to request control of the bus, such as signals I1_Req and I2_Req in FIG. 2. They are also used by the target modules to indicate the end of a transaction, such as the signal Req_End in FIG. 2, and, where appropriate, the success or failure of the transaction. Other control signals are also used to define the direction of the transaction (reading or writing), synchronize interchanges, and so on. In one embodiment, privileged access signals linked to initiator modules and/or to specific arbitration mechanisms according to the invention, such as the GUARD signal in FIG. 2, can also be supplied to the arbitration unit 46 as respective control signals.

The illustration of an example of operation of the arbitration unit according to such a plurality of mechanisms, using a step diagram of the type provided in FIG. 3, rapidly becomes very complex. However, the implementation of the arbitration unit in the form of a state machine remains clearly possible, and even particularly appropriate.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An electronic system, comprising:
a number N of functional modules, said number N of functional modules including a number P of initiator modules and a number Q of target modules, where N, P and Q are integer numbers such that $2 \leq P \leq N$ and $1 \leq Q \leq N$; and
an arbitration unit coupled to said N functional modules to, in response to a plurality of conflicting requests to access a common resource originating from a respective plurality of the initiator modules, grant an exclusive right of access to the resource to a defined one of said respective plurality of the initiator modules, wherein the arbitration unit is constructed to grant said exclusive right of access either via a first arbitration mechanism applied to said respective plurality of the initiator modules, or as a priority via a second arbitration mechanism applied only to members of a subset of said respective plurality of the initiator modules, the arbitration unit being constructed to receive, for each of the members, a privileged access signal linked to respective said each of the members and to said second arbitration mechanism.

2. An electronic system according to claim 1, wherein the initiator modules are linked to the target modules via the arbitration unit, which also forms a control module for information interchanges between said initiator modules and said target modules, the common resource being one of said target modules.

3. An electronic system according to claim 1, wherein the functional modules and the arbitration unit are linked together via a communication bus, the common resource being said communication bus which is used for information interchanges between said initiator modules and said target modules.

4. An electronic system according to claim 1, wherein the arbitration unit is constructed, in addition, to select the second arbitration mechanism as a higher level arbitration mechanism from a hierarchy of second arbitration mechanisms, which are applicable only to members of respective subsets of the plurality of initiator modules, the arbitration unit being constructed to receive, for each initiator module that is a member of one of the subsets, a corresponding privileged access signal linked to said initiator module and to said second arbitration mechanism applicable to the subset of which the initiator module is a member.

5. An electronic system according to claim 1, wherein the privileged access signal is generated by reading a value stored in a data register linked to respective each of said members.

6. An electronic system according to claim 5, wherein the data register linked to the respective member can be accessed in write mode by said respective member.

7. An electronic system according to claim 5, wherein the linked data register is included in the arbitration unit.

8. An electronic system according to claim 1, wherein the privileged access signal is a signal received from an external environment.

9. An electronic system according to claim 1 wherein the arbitration unit is implemented as a state machine.

10. A storage key comprising:
a non-volatile memory; and
a control circuit that includes:
a number N of functional modules, said number N of functional modules including a number P of initiator modules and a number Q of target modules, where N, P and Q are integer numbers such that $2 \leq P \leq N$ and $1 \leq Q \leq N$; and
an arbitration unit coupled to said N functional modules to, in response to a plurality of conflicting requests to access a common resource originating from a respective plurality of the initiator modules, grant an exclusive right of access to the resource to a defined one of said respective plurality of the initiator modules, wherein the arbitration unit is constructed to grant said exclusive right of access either via a first arbitration mechanism applied to said respective plurality of the initiator modules, or as a priority via a second arbitration mechanism applied only to members of a subset of said respective plurality of the initiator modules, the arbitration unit being constructed to receive, for each of the members, a privileged access signal linked to respective said each of the members and to said second arbitration mechanism.

11. A storage key according to claim 10, wherein the initiator modules are linked to the target modules via the arbitration unit, which also forms a control module for information interchanges between said initiator modules and said target modules, the common resource being one of said target modules.

12. A storage key according to claim 10, wherein the functional modules and the arbitration unit are linked together via a communication bus, the common resource being said communication bus which is used for information interchanges between said initiator modules and said target modules.

13. A storage key according to claim 10, wherein the arbitration unit is constructed, in addition, to select the second arbitration mechanism as a higher level arbitration mechanism from a hierarchy of second arbitration mechanisms, which are applicable only to members of respective subsets of the plurality of initiator modules, the arbitration unit being constructed to receive, for each initiator module that is a member of one of the subsets, a corresponding privileged access signal linked to said initiator module and to said second arbitration mechanism applicable to the subset of which the initiator module is a member.

14. A storage key according to claim 10, wherein the privileged access signal is generated by reading a value stored in a data register linked to respective each of said members.

15. A storage key according to claim 14, wherein the data register linked to the respective member can be accessed in write mode by said respective member.

16. A storage key according to claim 14, wherein the linked data register is included in the arbitration unit.

17. A storage key according to claim 10, wherein the privileged access signal is a signal received from an external environment.

18. A storage key according to claim 10 wherein the arbitration unit is implemented as a state machine.

19. An arbitration method of arbitrating between conflicting requests from a plurality of initiator modules to access a common resource, the method comprising:
determining from a privileged access signal received from a hardware resource whether a subset of the initiator modules has been given a privileged right of access to the common resource;
if the determining determines that none of the initiator modules has been given a privileged right of access to the common resource, then granting an exclusive right of access to the resource to a defined one of said plurality of the initiator modules according to a first arbitration mechanism applied to said plurality of the initiator modules; and
if the determining determines that the subset of the initiator modules has been given a privileged right of access to the common resource, then granting said exclusive right of access to the resource to said defined one of said subset of initiator modules according to a second arbitration mechanism applied only to members of the subset of initiator modules.

20. The method of claim 19, further comprising:
selecting the second arbitration mechanism as a higher level arbitration mechanism from a hierarchy of second arbitration mechanisms, which are applicable only to members of respective subsets of the plurality of initiator modules; and
receiving, for each initiator module that is a member of one of the subsets, a corresponding privileged access signal linked to said initiator module and to said second arbitration mechanism applicable to the subset of which the initiator module is a member.

21. The method of claim 19 wherein the hardware resource is at least one data register linked to the subset of initiator modules.

22. The method of claim 21, further comprising writing a value, using an initiator module of the subset of initiator modules, into the data register to enable the data register to output the privileged access signal.

23. The method of claim 19 wherein the determining and granting are implemented using a state machine.

24. An electronic system, comprising:
a group of initiator modules; and
an arbitration unit coupled to said group of initiator modules to, in response to a plurality of conflicting requests to access a common resource originating from a respective plurality among the group of initiator modules, grant an exclusive right of access to the resource to a defined one of said respective plurality of the initiator modules,
wherein the arbitration unit is adapted to grant said exclusive right of access either via a first arbitration mechanism applied to said respective plurality of the initiator modules, or as a priority via a second arbitration mechanism applied only to members of a subset of said respective plurality of the initiator modules, the arbitration unit being adapted to receive, for each of the members, a privileged access signal linked to respective said each of the members and to said second arbitration mechanism.

25. The system of claim 24 wherein said arbitration unit is a state machine.

26. The system of claim 24 wherein said first arbitration mechanism is a round robin algorithm or a least recently used algorithm.

27. The system of claim 24 wherein said arbitration unit is adapted to grant said exclusive right of access via said second arbitration mechanism based on selection of one of said members having its linked privilege access signal in an active state.

* * * * *